L. R. McGUIRE.
RUBBER EXTRUDING, COOLING, AND CUTTING APPARATUS.
APPLICATION FILED NOV. 11, 1919.
1,382,207.
Patented June 21, 1921.
3 SHEETS—SHEET 1.
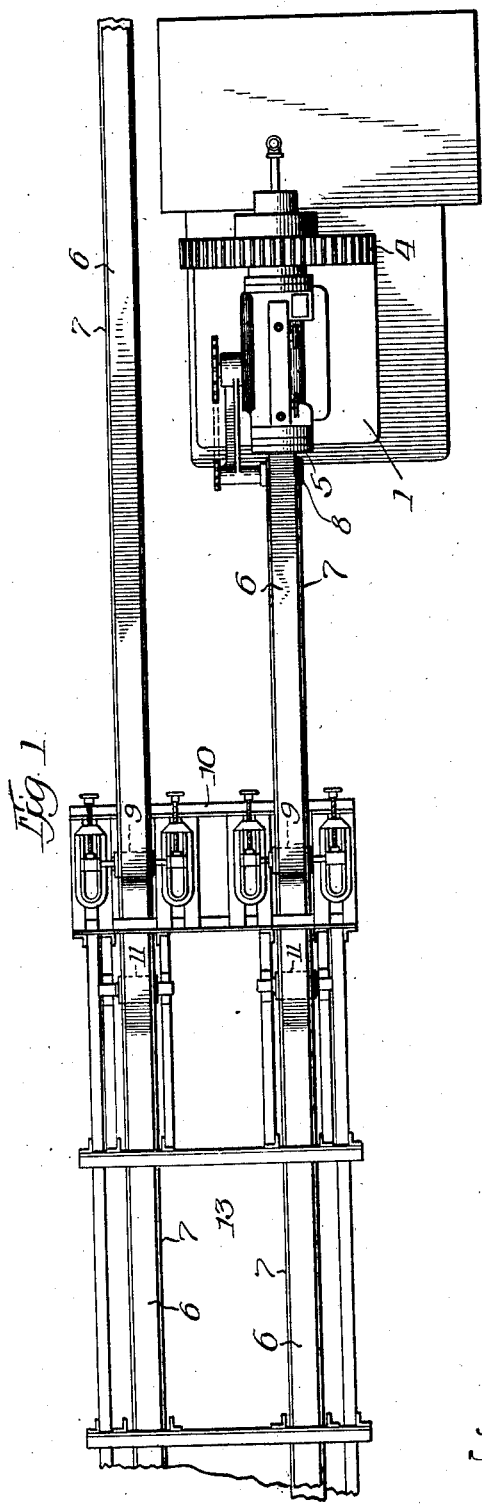
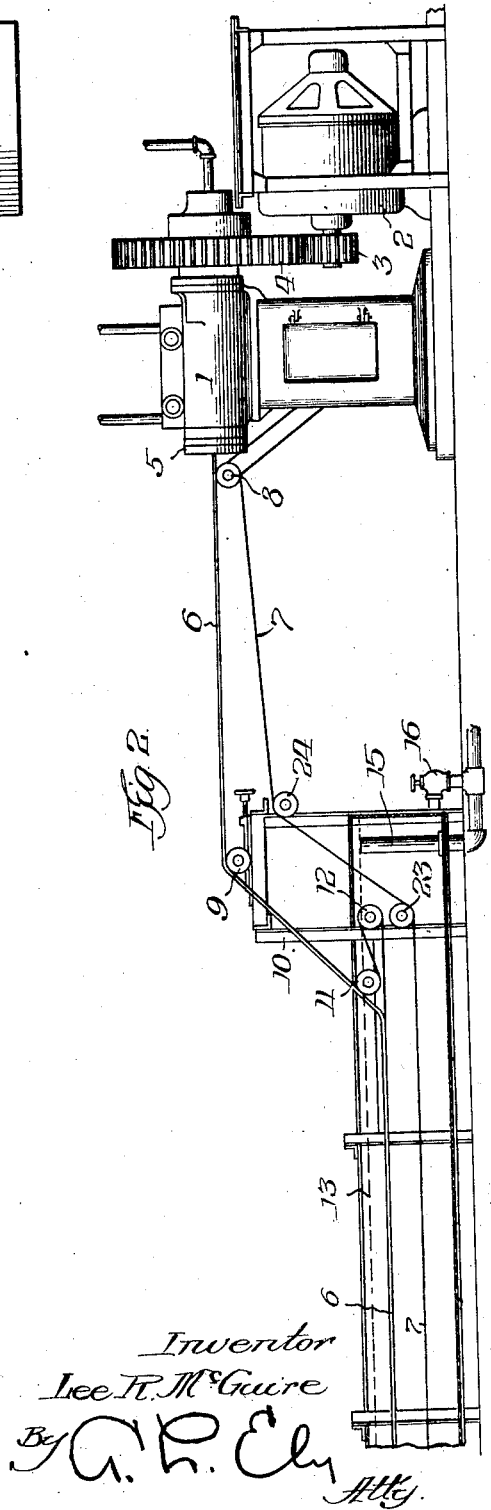
Inventor
Lee R. McGuire
By G. L. Ely
Atty.

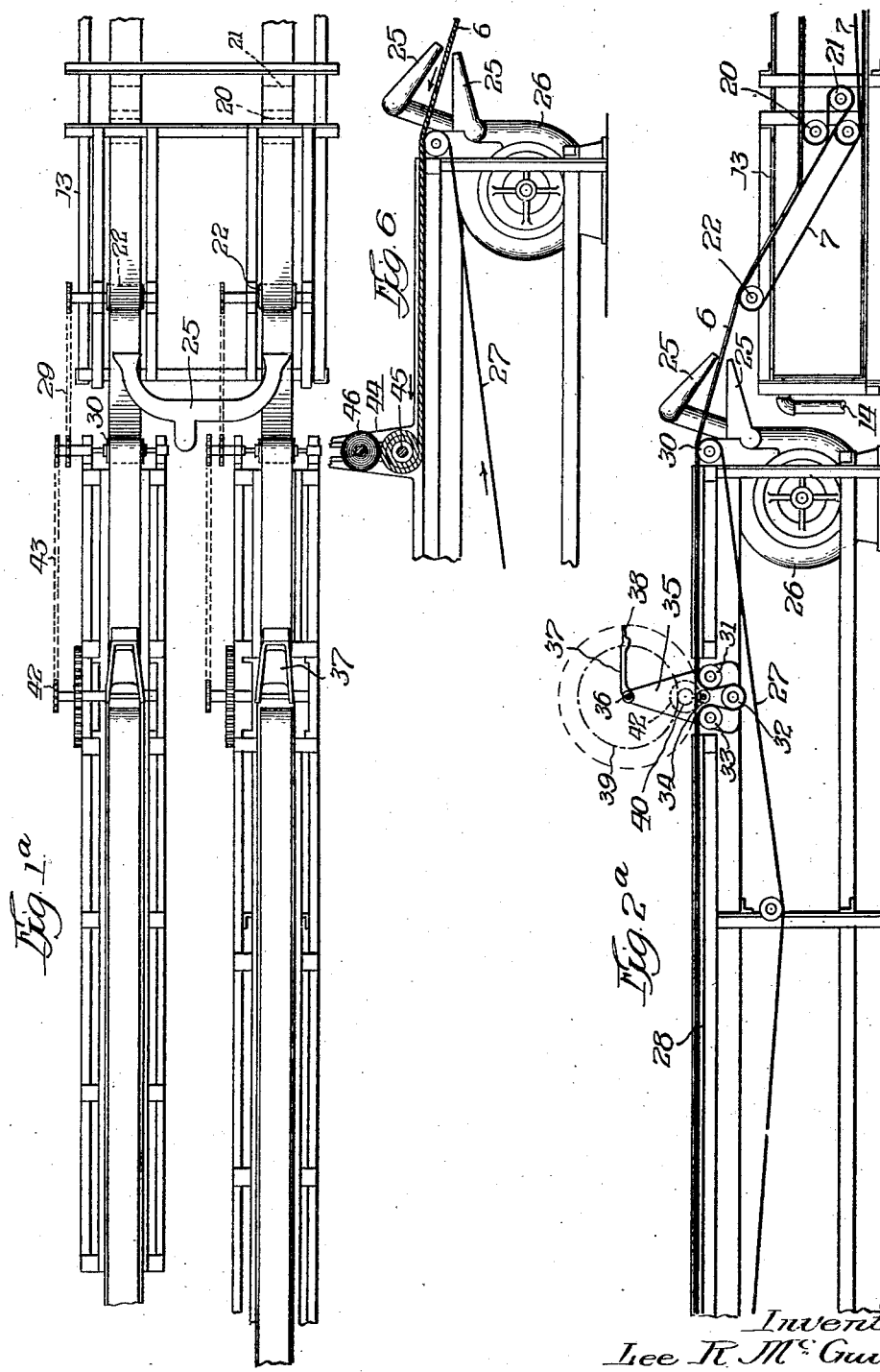

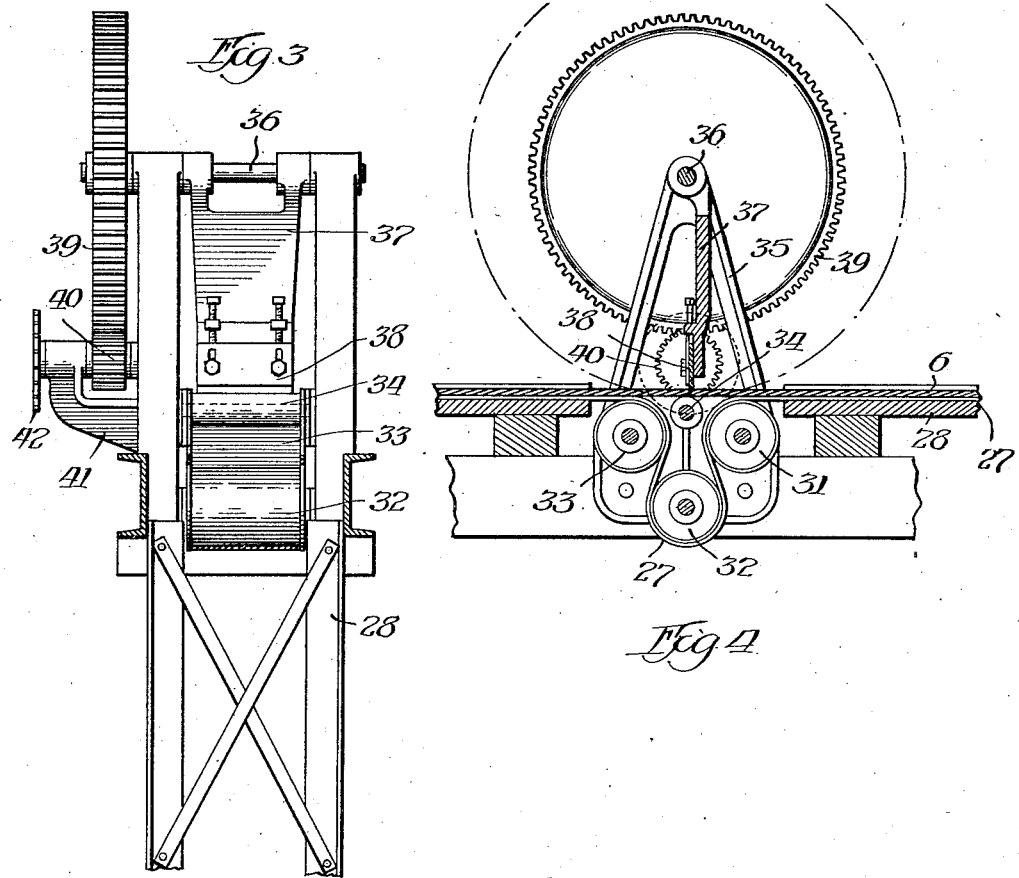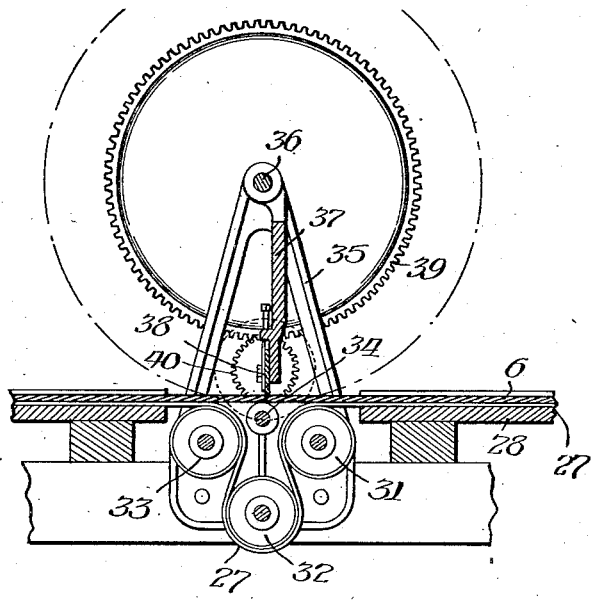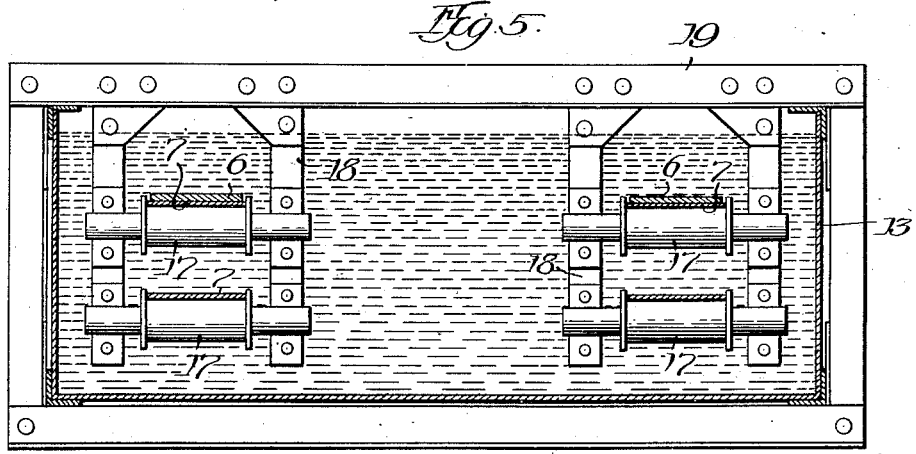

UNITED STATES PATENT OFFICE.

LEE R. McGUIRE, OF AKRON, OHIO, ASSIGNOR TO THE FIRESTONE TIRE AND RUBBER COMPANY, OF AKRON, OHIO, A CORPORATION OF OHIO.

RUBBER EXTRUDING, COOLING, AND CUTTING APPARATUS.

1,382,207.   Specification of Letters Patent.   Patented June 21, 1921.

Application filed November 11, 1919. Serial No. 337,281.

*To all whom it may concern:*

Be it known that I, LEE R. McGUIRE, a citizen of the United States, residing at Akron, county of Summit, and State of Ohio, have invented certain new and useful Improvements in Rubber Extruding, Cooling, and Cutting Apparatus, of which the following is a specification.

This invention relates to a machine for use in rubber mills, and is designed to improve and hasten certain steps in the manufacture of articles of rubber, especially such articles as are capable of being formed by the process of extrusion or "tubing" as it is generally known in rubber factories.

While the invention is adaptable for the manufacture of many different articles of rubber, the particular apparatus shown here is intended and designed for use in the manufacture of treads by the process of tubing or extrusion. Heretofore, treads which have been formed in any fashion have been cut to approximately the size required for use, enough being allowed to accommodate the subsequent shrinkage which occurs during cooling and aging. It has heretofore been the general practice to stack the treads in books or liners and allow them to cool and age for a period of one to two days during which time the rubber assumes its normal condition. It is impossible to cut a tread of the exact length under the old conditions as the shrinkage is variable and cannot be determined beforehand. It is necessary always to have on hand a large amount of tread stock which occupies valuable floor space and requires a large amount of liner fabric and books. The waste stock which is cut from the treads when they are prepared for tire manufacture becomes a considerable item and the conserving of this waste would amount to a large saving.

By the apparatus shown here, I am enabled to cool the treads directly after they leave the extruding machine, whereby the shrinkage takes place at once and the tread strip may be cut to exactly or nearly exactly the length required for the finished product. Not only is saved the floor space and equipment necessary for the storage of the aging treads by this means, but the scrap rubber is greatly reduced. At the same time the quality of the rubber is not affected in any way.

Figures 1 and 1ª, Sheets 1 and 2, respectively, are plan views of the apparatus, the second figure being a continuation of the first, but with a considerable portion of the cooling tank removed.

Figs. 2 and 2ª are elevations of the prior figures.

Fig. 3 is a vertical section through the belt at the knife.

Fig. 4 is a longitudinal section of the knife.

Fig. 5 is a cross section of the tank.

Fig. 6 is a modification which may be used if the strip of rubber is not to be cut at once.

It will be understood that while the invention is described in these specifications in great detail, such details are non-essential and may be varied. It will also be understood that although the invention is shown as applied to the manufacture of tire treads, it is not necessarily limited to this particular use, but may be adapted for use in other branches of the rubber industry.

The invention comprises a machine for forming the strip of rubber in the cross section which it is designed to assume, which machine in this instance is shown as an extruding or tubing machine 1. Any other type of a machine for forming the tread strip may be substituted for the tubing machine. The tubing machine is driven from a motor 2 having a pinion 3 in mesh with the main screw shaft driving gear 4. The tubing machine and the die 5 are heated by any suitable means to keep the rubber in plastic condition so that it can be expressed from the die. The strip of hot rubber as it issues from the die is shown at 6, and is conducted on to a conveyer belt 7. This belt passes over a driven pulley 8 located at the die and over a pulley 9, adjustably mounted on a base or standard 10. From the pulley 9 the belt is inclined downwardly and passes over a pulley 11 making a loop to the pulley 12 located at the rear thereof.

It will be noted from an inspection of the drawing that the belts are arranged in duplicate in this machine, only one of the tubing machines being shown. The number of belts may be increased or diminished if desired.

The pulleys 11 and 12 are located within a tank 13 in which there is maintained a constant level of cold water. This water is supplied and kept in circulation by a feed pipe 14 at one end of the tank and a waste pipe 15 set at the desired level above the pulleys 11 and 12 at the other. There is also provided a drain pipe 16 through which the tank may be emptied.

From the pulley 12 the belt 7 passes over a plurality of idler pulleys 17 supported in hangers 18 suspended from cross beams 19 over the top to the tank. The tank is of considerable length, the exact dimensions being unimportant except that the rubber strip should be thoroughly cooled before it leaves the tank. At the discharge end of the tank there are arranged a pair of rollers 20 and 21, from which latter roll the belt passes upwardly to a pulley 22 above the level of the water in the tank. From thence the belt returns over a plurality of idlers 17 to a pulley 23 located under the pulley 12 and then over a pulley 24 on the framework 10 to the pulley 8.

The tread strips leave the belts 7 at the pulley 22 and pass through a water removing device of any preferred form. That shown herein comprises a pair of nozzles 25 for each tread strip, one nozzle being placed above and the other below the tread strip. These nozzles are connected to a fan 26, which forces a constant powerful current of air on the rubber. The nozzles are pointed backward toward the tank and the water is removed from the tread strip at this point.

From between the nozzles 25 each tread strip passes to a belt 27 which runs over a table 28, and is driven in synchronism with the belt 7 by a sprocket chain 29 which connects the shaft of the pulley 22 with the shaft of the first pulley 30 over which the belt 27 passes.

At some convenient point on the table the belt is conducted downwardly around three rolls 31, 32, and 33 so that a gap is made, over which the tread strip travels. Midway of this gap at the level of the top of the table 28 is arranged an idler roll 34.

Supported in brackets 35 directly above the roller 34 is a shaft 36 which has secured thereon an arm 37, the end of which carries an adjustable knife blade 38, arranged to just clear the roller 34. The shaft 36 is rotated by a gear 39 in mesh with a pinion 40 located in a bracket 41 at the side of the table. A sprocket 42 is also secured to the same shaft as the pinion 40, being connected by a chain 43 to the shaft of the roller 30. In this manner the knife and the belt are run in synchronism and by properly adjusting the driving connections the knife may be made to cut treads of given lengths.

It will be seen that by the apparatus shown, the tread cut to the proper length and cooled is ready for immediate application to the tire.

In case it is not desired to cut the treads at this time, it may be desired to roll the strip of rubber up between liners and handle it elsewhere. A modification for this purpose is shown in Fig. 6 in which the knife standard is replaced by a pair of uprights 44, between which is received a shaft 45 on which the tread strip is rolled up, an intermediate liner strip being supplied from a roll 46.

Alterations and modifications may be made in the form of the apparatus without departing from the invention, and it will be understood that changes within the scope of the invention are intended to be covered herein.

I claim:

1. An apparatus for the preparation of rubber comprising a forming machine in which the rubber is formed in a strip, a tank, means for supplying the tank with water, and a conveyer for supporting and conducting the rubber strip through the tank.

2. An apparatus for the preparation of treads or similar articles, the combination of a tubing machine, a tank adjacent the machine, means for supplying the tank with a cooling liquid, a conveyer belt leading from the tubing machine to and through the tank, and a drying apparatus through which the tread strip passes on its way from the tank.

3. An apparatus for the preparation of treads comprising a machine for forming the treads in a continuous strip, a cooling tank, a conveyer for conducting the tread from the forming machine to and through the tank, and an apparatus for dividing the strip transversely as the strip passes from said tank, said dividing means operating in synchronism with the conveyer.

4. An apparatus for the preparation of treads comprising a machine for forming the treads in a continuous strip, a cooling device, and a knife for cutting treads from the strip, and means for conducting the tread strip through the apparatus.

5. An apparatus for the preparation of rubber comprising a forming machine, a cooling device, a knife and a conveyer for leading the rubber through the apparatus.

6. An apparatus for the preparation of rubber comprising a forming machine, a cooling tank, means for supplying water to said tank, a drying device and a knife, and a conveyer for leading a rubber strip from the forming machine through the apparatus.

7. An apparatus for the preparation of rubber treads, comprising a tubing machine to form the treads in a continuous strip, a cooling tank, means for supplying water to said tank, a conveyer leading from said tubing machine to and through the tank, and means for driving the water from the tread as it issues from the tank.

8. An apparatus for the preparation of rubber treads, comprising a tubing machine to form the treads in a continuous strip, a cooling tank, means for supplying water to said tank, a conveyer leading from said tubing machine to and through the tank, means for driving the water from the tread as it issues from the tank, and a cutter to sever the treads from the strip.

9. An apparatus for the preparation of rubber treads comprising a machine for extruding the treads in the form of a continuous strip, a cooling tank, a conveyer leading from the extruding machine to and through said tank, and a pair of blowers directed toward the tread as it issues from the tank.

10. An apparatus for the preparation of rubber treads, comprising a machine for extruding the treads in the form of a continuous strip, a cooling tank, a conveyer leading from the extruding machine to and through said tank, a pair of blowers directed toward the tread as it issues from the tank, and a cutter to sever the treads from the strip.

LEE R. McGUIRE.